United States Patent [19]
Finley et al.

[11] 4,010,569
[45] Mar. 8, 1977

[54] CONNECTOR FOR FLEXIBLE LINES

[76] Inventors: T. J. Finley; Gwendolyne Finley, both of 506 Countryside Road, Junction City, Kans. 66441

[22] Filed: Oct. 15, 1975

[21] Appl. No.: 622,768

[52] U.S. Cl. .................... 43/44.83; 24/115 K; 24/129 D; 24/237
[51] Int. Cl.² ................................ A01K 91/04
[58] Field of Search ............... 43/44.83; 24/73 HR, 24/73 HH, 81 F, 115 K, 129 D, 130, 237; 403/209

[56] References Cited
UNITED STATES PATENTS

| | | | |
|---|---|---|---|
| 1,322,410 | 11/1919 | Connelly | 24/130 X |
| 2,564,260 | 8/1951 | Houser | 24/237 |
| 2,783,515 | 3/1957 | Tobias | 24/129 D X |
| 3,435,552 | 4/1969 | Caldwell | 43/44.98 X |

Primary Examiner—Russell R. Kinsey
Assistant Examiner—Daniel J. Leach
Attorney, Agent, or Firm—Fishburn, Gold & Litman

[57] ABSTRACT

A connector for attaching two or more segments of lines, preferably lines which have looped end portions. The connector consists of a body with two apertures extending transversely therethrough, and two slots which extend obliquely from the apertures to the exterior surface of the body in a parallel and opposing fashion. The structure of the body and slots is that the slots are normally in a substantially closed position and portions of the body adjacent the slots have resilience to permit the opening of the slots and passage of the line therethrough for connecting or disconnecting the lines therewith. By placing the looped end portion of each segment in an outwardly most portion of the slot and pulling the loop in the direction of the aperture, the portion of the body adjacent the slot widens sufficiently to allow the link to pass through the slot to the aperture. The slot closes and thereby retains the line in the body, providing removable connection of the various line segments.

9 Claims, 6 Drawing Figures

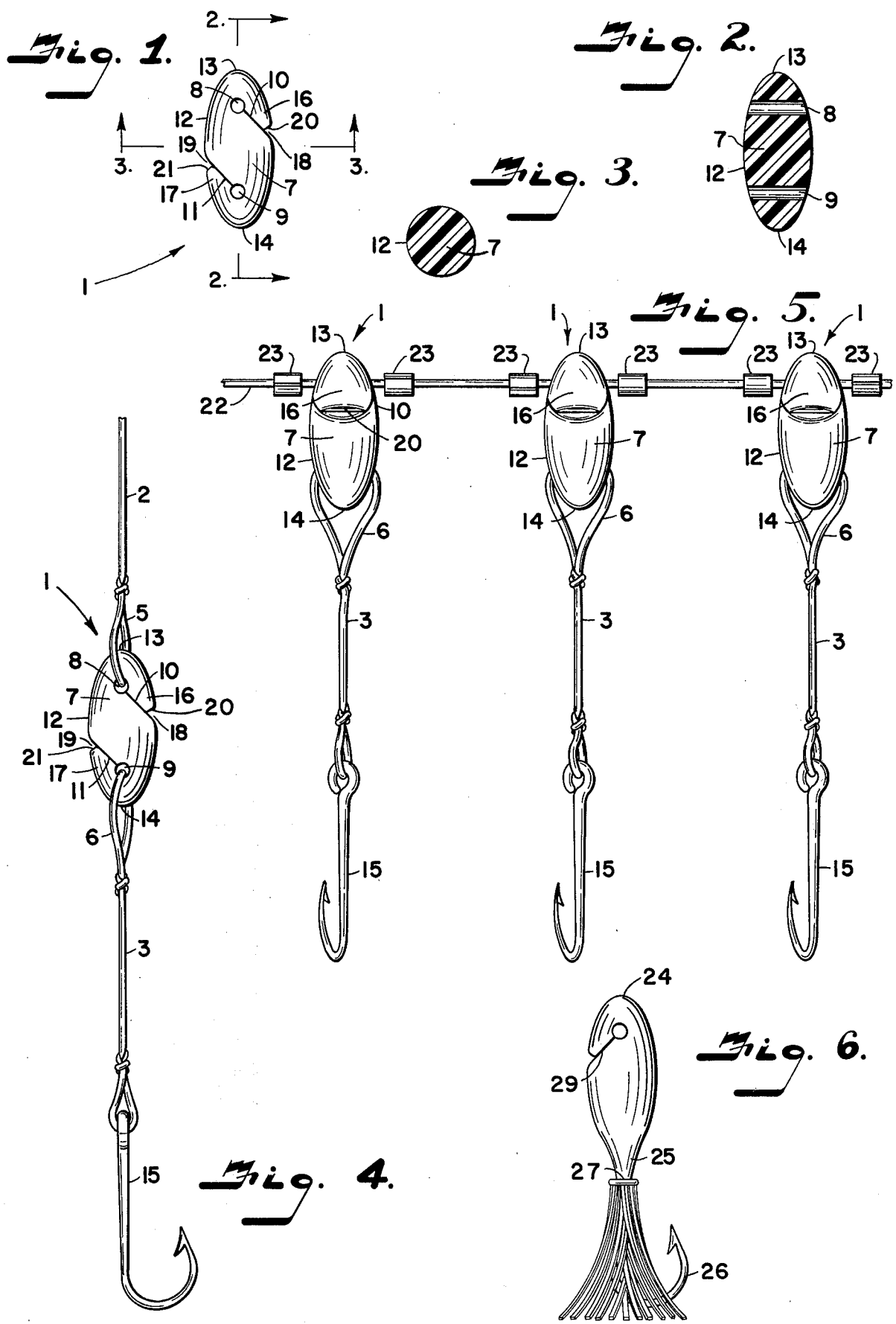

CONNECTOR FOR FLEXIBLE LINES

This invention relates to line segment connectors, and more particularly to leader connectors for fish lines.

In the art of fishing, removable leaders are quite well known. The fishermen often replace hooks and lures as a result of loss, storage, bait changes, transportation and other such reasons. Easy and quick removal of the leader from the line is therefore advantageous. One common system for aiding in connection of hook is the use of snelled fishing hooks and lures which have a short piece of leader of line attached at one end to the hook and which has a loop at the other end of the leader or line. The use of snelled hooks and lures to promote easy leader change is also well known in the art.

Prior art devices for fish line connection include the swivel and snap mechanism, wherein the fastener is fashioned after a safety pin. This device is expensive to manufacture and difficult to operate, particularly when wet. Since such mechanisms are relatively heavy and large, they can also adversely affect fishing by dampening lure action. The present invention is an improvement over such prior art leader connections in many ways including that it is inexpensive to manufacture, simple in design and use, and relatively small and lightweight.

The principal objects of the present invention are: to provide a one-piece connector which may be easily manipulated to quickly remove the leader or lines connected therewith whenever desired; to provide such a connector which has a durable, lightweight, non-corrosive body with resilient portions wherein a pair of slots, which are normally closed, and a pair of apertures, removably retain the leader or line in a secure manner; to provide such a connector wherein the body is hydrodynamically designed to reduce fluid friction and increase ease of use; to provide such a connector wherein a pilot edge is provided at each slot for the quick and easy insertion of fish line therein; and to provide such a connector which is economical to manufacture, efficient in use, and capable of long operating life and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features of the apparatus.

FIG. 1 is a side view of the connector.

FIG. 2 is a sectional view of the connector taken along the line 2—2 of FIG. 1.

FIG. 3 is a sectional view of the connector taken along the line 3—3 of FIG. 1.

FIG. 4 is a side view of the connector, connecting a line to a leader having a hook on the free end thereof.

FIG. 5 is a front view of the connector used to connect a plurality of hooks to a trotline, or the like.

FIG. 6 is a side view of another embodiment of the connector, wherein a fish lure is fixed to one end thereof.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The structure illustrated in FIGS. 1 through 5 inclusively is an embodiment of the invention having a connector 1 for attaching two or more pieces of line 2 and 3 with end portions having loops 5 and 6 wherein a body member 7 has two spaced apart transverse apertures 8 and 9 therein. The body member 7 has slots 10 and 11 providing access to the apertures 8 and 9 from the outer surface 12 of the body, such that when either of the slots 10 or 11 is forced open, the loop 5 or 6 at an end portion of fish line 2 or leader 3 can be inserted through the slot into the aperture, or removed from the aperture. In their normally closed position, which is maintained by the body's resiliency, the line 2 and lure leader 3 are securely retained in the apertures 8 and 9, such that a snelled hook 15, lure, or fish line 2 cannot be unintentionally removed therefrom.

In the structure illustrated, the body 7 is a solid, one-piece structure which is hydrodynamically designed to minimize fluid friction when the connector travels through the air and through the water. All parts and exposed edges are preferably rounded to eliminate any sharp edges on the body 7 that could cause fraying the fish line. The hydrodynamic requirement of the present invention could be provided by some variations in the shape of the body 7, which is shown in FIGS. 1-5 as generally ovate in shape, having a substantially elliptical transverse cross-section and a substantially circular longitudinal cross-section. The body 7 preferably is manufactured from a lightweight, resilient, yet rigid material such as synthetic resin, wood, metal or the like, with sufficient tensile strength to withstand localized, high pressure loading caused by sudden forces in the thin line. As the connector is used in and around water, the body material must be substantially invulnerable to corrosion, and capable of retaining its resilience over a relatively long period of time. Nylon and polyester are examples of suitable synthetic resin materials.

The apertures 8 and 9 receive the looped end portion 5 of fish line 2 and the looped end portion 6 of leader 3, and retain them therein so as to accomplish the connection. Any number of apertures or various configurations thereof may be employed to satisfy the requirements of a particular application. As shown in FIGS. 1 and 2, the apertures 8 and 9 extend through the body 7 near each end 13 and 14 thereof, and are perpendicularly disposed to the longitudinal axis of the body. The apertures 8 and 9 may have any suitable shape and are illustrated as having a circular, transverse cross-section, with the diameter slightly larger than the line, such that the line can turn freely within each aperture. The axes or centers of apertures 8 and 9 preferably are disposed on the longitudinal axis of body 7.

The slots 10 and 11 form passageways from the exterior surface 12 of the body, to the apertures 8 and 9, through which looped end portions of the fish line may pass; said slots may be in planes parallel to the axes of the apertures, however, it is preferred that the slots be in a plane extending through the respective aperture axis. In their normal state, the slots are closed and a line located in apertures 8 and 9 may not inadvertently escape. Since the body material is resilient, lateral forces applied at either end of the body 7 may cause the slots 10 and 11 to selectively open for facilitating line removal or insertion. The slots 10 and 11 extend in a parallel and opposing fashion from apertures 8 and 9 respectively, to the body surface 12 at an oblique angle to the longitudinal axis of the body. The slots 10 and 11, as shown, are disposed on opposite sides of the body 7 and axial line tension will not cause the line to escape from the apertures 8 and 9. Slot 10 which extends from aperture 8 to the body surface 12 is directed away from the body's end portion 13 nearest to aperture 8. In a similar fashion, slot 11 extends away from the end portion 14 of the body nearest aperture 9. This arrangement of the slots forms tongue portions 16 and 17 that diminish in cross-section from adjacent the respective aperture to the tip at the outer end of the slot. In order to promote easy entrance of the line into the slots 10 and 11, the extreme end or tip of the tongues 16 and 17 have been removed forming notches 18 and 19 with pilot surfaces 20 and 21 for receiving a line or loop portion to be moved into a respective aperture. The notches 18 and 19 are formed by making a perpendicular cut across the body surface 12 at the extreme edge of the tongue 16 and 17 so the surfaces 20 and 21 form wedge shaped notches.

As can best be seen in FIGS. 1 and 2, apertures 8 and 9 preferably are disposed on the longitudinal axis of the body. The size of the body 7 is dependent upon the specific application in which the connector is to be used. For example, when used in fly fishing for fish such as trout, the body size is preferably small and is preferably made from the lighter materials such as wood, plastic, and the like, so that the fly will not be submerged by the connector's weight. The connectors for rod and reel casting for larger fish, such as bass, are somewhat larger and made of the stronger materials such as nylon and the like. Connectors for large game fish such as pike, lake trout, muskellunge, as well as for deep sea fishing, preferably have very large bodies and are preferably made from the strongest material such as linear plastic, metal and the like.

FIG. 4 discloses the connector as used in attaching line 2 to leader 3. The looped end portion 5 of the line is guided through slot 10 by a pilot edge 20 into aperture 8. Similarly, the looped end portion 6 of the leader 3 is positioned in aperture 9. Since the body's resilience keeps the slots 10 and 11 in a normally closed position, it is unlikely that either the line 2 or the leader 3 will inadvertently escape from the apertures during casting. When tension is applied to the line 2 by the fisherman, the longitudinal axis of the body 7 is drawn into alignment with the axis of the line 2 so as to secure the line - leader connection. Although line tension may cause the slots 10 and 11 to open slightly, because the material is resilient, the slots will close when line tension is reduced and hence resecure the connection. When the fisherman desires to change the leader 3 one side of the loop 6 of leader 3 is placed in notch 19 and pulled through the slot 11 until it is free therefrom.

In addition to the use disclosed in FIG. 4, the connectors can be attached to form a trotline as shown in FIG. 5, simply by attaching several connectors 1 to a single trotline 22, or the like. Separators 23 may be placed on either side of the connector so as to position the connectors evenly and securely along the line, the connectors being freely rotatable about said line. If the trotline 22 is orientated at an angle, the separators 23 will maintain the connectors' positioning. In this manner, the trotline 22 may be orientated vertically and the snelled hooks 15 or lines 3 will also assume vertical orientation.

Another embodiment of the present invention is depicted in FIG. 6, wherein the body has a teardrop shape. One end portion 24 of this embodiment is identical to the body end portion 13 previously described. The other end portion 25, however, differs in that in lieu of slot and aperture members, a hook 26 or lure is permanently attached at the end 27 of the body. Hence, the lure 26 can be attached directly to the looped end portion 5 of the fish line 2.

It is to be understood that while we have illustrated and described certain forms of our invention, it is not to be limited to the specific forms or arrangement of parts herein described and shown.

What we claim and desire to secure by Letters Patent is:

1. A connector for lines and the like comprising:
   a. an ellipsoidal body, having an elliptical longitudinal cross-section and being substantially uniform about the longitudinal axis with a circular transverse cross-section wherein:
      1. said body is solid, one-piece, and constructed from a resilient material which is substantially impervious to corrosion; and
      2. said body has first and second ends;
   b. said body having first and second apertures extending transversely therethrough;
      1. said apertures are cylindrical in shape;
      2. the axes of said apertures define a plane which passes through the longitudinal axis of said body;
      3. the diameters of said apertures are slightly greater in size than the diameters of fishing lines engaged therein, such that said line can freely rotate in said apertures; and
      4. said first and second apertures being spaced an equal distance from said first and second ends respectively, and near thereto; and
   c. said body having a normally closed slot, intersecting said first aperture and extending therefrom obliquely, outwardly and away from said first end in a plane which passes through the first aperture, said slot terminating in a first opening and forming a passage for movement of a line to said first aperture.

2. A connector as set forth in claim 1 wherein:
   a. said body has a second normally closed slot;
      1. said second slot intersecting said second aperture, the intersections of the first and second slots with the respective first and second apertures being on planes which pass through the axes of said respective first and second apertures;
      2. said second slot extends from said second aperture obliquely and outwardly from the longitudinal axis of said body, and away from said second end; and
      3. said second slot terminates in a second opening at the exterior surface of said body, thereby forming a passage for movement of a line therethrough, to and from said second aperture.

3. A connector as set forth in claim 2 wherein:
   a. said body has first and second tongues:
      1. said first tongue being the portion of said body between the first aperture and the opening of the first slot and disposed outwardly between said first slot and the adjacent exterior surface of said body;
   2. said second tongue being the portion of said body between the second aperture and the opening of the second slot and disposed outwardly between said second slot and the adjacent exterior surface of said body;
   3. said tongues diminishing in cross-sectional area from that portion thereof adjacent said aperture to that portion thereof adjacent said opening; and
   4. said tongues having some resilience for movement to open said slots for the passage of a line therethrough to and from said apertures.

4. A connector as set forth in claim 3 wherein:
 a. said first and second tongues are truncated at said first and second openings respectively, so as to define first and second notches at said first and second openings respectively, for facilitating insertion of a line into said slots.

5. A connector for lines and the like comprising:
 a. an elongate body, generally ovate in shape, having first and second ends;
 b. said body is ellipsoidal in shape, having an elliptical longitudinal cross-section and a circular transverse cross-section;
 c. said body having an aperture extending transversely therethrough, adjacent to and spaced from said first end;
 d. said aperture is cylindrical in shape, the axis thereof passing through the longitudinal axis of said body, the diameter of said aperture being slightly greater than that of a fishing line engaged therein;
 e. a normally closed slot in said body, intersecting said aperture and extending therefrom obliquely, outwardly and away from said first end, said slot terminating in an opening and forming a passage for movement of a line to said aperture;
 f. said body includes a tongue:
   1. said tongue being defined as that portion of said body disposed outwardly between said slot and the exterior surface of said body;
   2. said tongue diminishing in cross-sectional area from that portion thereof adjacent said aperture to that portion thereof adjacent said opening; and
   3. said tongue having some resilience for movement to open said slot for the passage of a line therethrough to and from said aperture;
 g. said slot intersects said aperture on a plane which passes through the axis of said aperture; and
 h. said tongue at the opening of said slot is truncated so as to define a notch at said opening for facilitating insertion of a line into said slot.

6. A connector as set forth in claim 5 wherein:
 a. said body is of a teardrop shape;
 b. a lure is permanently affixed to a smaller end of said body; and
 c. said slot is disposed at an oblique angle to the longitudinal axis of said body.

7. A connector for fishing lines and the like having a loop at an end thereof comprising:
 a. an elongate one piece body of resilient material and having an ellipsoidal longitudinal shape with first and second ends and being substantially uniform around the longitudinal axis thereof;
 b. said body having first and second apertures extending transversely therethrough, said apertures being substantially cylindrical with axes thereof intersecting the longitudinal axis of the body, said apertures being larger than lines received therein whereby said lines are freely movable therein;
 c. a normally closed slot in said body and intersecting said first aperture on a plane which passes through the axis of the first aperture, said slot being disposed at an oblique angle to the longitudinal axis of the body and extending from said first aperture in a direction away from the adjacent body end and terminating in an opening, said slot forming a passage for movement of a line to said first aperture; and
 d. said body having a notch at the outer opening of the slot permitting placing of an intermediate portion of a line end loop in the notch and pulling on the line and loop toward said adjacent end of the body to move said intermediate loop portion through the slot into said first aperture to complete connection of the line to said body.

8. A connector as set forth in claim 7 wherein:
 a. said body includes a tongue;
   1. said tongue being defined as that portion of said body disposed outwardly between said slot and the exterior surface of said body;
   2. said tongue diminishing in cross-sectional area from that portion thereof adjacent said aperture to that portion thereof adjacent said opening; and
   3. said tongue having some resilience for movement to open said slot for the passage of a line therethrough to and from said aperture.

9. A connector for fishing lines and the like having a loop at an end thereof comprising:
 a. an elongate one piece body of resilient material and having first and second ends, said body being substantially uniform around the longitudinal axis thereof and having an ellipsoidal streamlined shape from said first end;
 b. a fishing lure affixed to the body adjacent the second end thereof;
 c. said body having an aperture extending transversely therethrough, said aperture being substantially cylindrical with the axis thereof intersecting the longitudinal axis of the body, said aperture being larger than a line received therein whereby the line is freely movable therein;
 d. a normally closed slot in said body and intersecting said aperture on a plane passing through the axis of said aperture, said slot being disposed at an oblique angle to the longitudinal axis of the body and extending from said aperture in a direction away from said first end of the body and terminating in an opening, said slot forming a passage for movement of a line to said aperture; and
 e. said body having a notch at the outer opening of said slot permitting placing of an intermediate portion of a line end loop in the notch and pulling on the line and loop toward said first end of the body to move said intermediate loop portion through said slot into said aperture to complete connection of the line to said body.

* * * * *